United States Patent Office 2,759,902
Patented Aug. 21, 1956

2,759,902

SOIL CONDITIONING AGENTS

Finn Claudi-Magnussen and Anthony James Martinelli, Easton, Pa., assignors to General Aniline & Film Corporation, New York, N. Y., a corporation of Delaware No Drawing. Application March 27, 1953,
Serial No. 345,244

12 Claims. (Cl. 260—27)

The present invention relates to soil conditioning agents and particularly to an improved soil conditioning mixture containing rosin or calcium resinate and a copolymer of vinyl ester or alkyl vinyl ether and maleic anhydride.

Considerable public interest in the possibility of conditioning the physical structure of soils and enhancing their capacity for retaining moisture and maintaining healthy plant growth has arisen since the announcement and introduction by several manufacturers of their particular synthetic polyelectrolyte soil conditioners.

Many of the soil conditioners now available are salts of a hydrolyzed polymer of acrylonitrile and partial calcium salt of the copolymer of vinyl esters and maleic anhydride. When dissolved in water or exposed to soil moisture, the polymer exists as a polyanion. Through electrical forces, these polymers form strong bonds with clay. The chain-like molecules are thought to form bridges holding together the clay particles and thus preserve the aggregates typical of soils with good structure.

The salts of hydrolyzed polyacrylonitrile, as well as the copolymers and especially the salts of copolymers of maleic acid anhydride and vinyl esters, are said to produce aggregation in much the same way as do certain components of natural soil humus which is formed in small quantities during the decomposition of plant residues, manures, and various other organic matter.

From the results so far obtained from a study of the chemistry and reactivity of the currently available soil conditioning agents, aggregation of minute clay particles appears to be the primary consideration. Each copolymer unit, either as the hydrolyzed copolymer or salt thereof, reacts with or is adsorbed to several minute clay particles to form a larger particle, an aggregate. The proper choice of polyelectrolyte and concentration will produce sufficient aggregation of clay particles to form small crumbs or granules. These crumbs or granules will occupy a larger volume than the original clay particles and voids will exist between these particles. Many of these voids will connect with others by virtue of their spatial arrangements to give a more permeable medium than existed prior to aggregation. The net result is that the conditioned soil will permit the flow of larger quantities of water. This result is highly desirable as clay soils frequently have both very low porosities and permeabilities and are unable to store sufficient water during wet seasons to provide adequate moisture during dry seasons. Water also tends to collect in low places on untreated clay soils and to form boggy spots which crust on drying. This situation may also be corrected by aggregation of the soil particles with a polyelectrolyte. The best results are obtained by using a minimum amount of polyelectrolyte which will give satisfactory aggregation.

While the salts of hydrolyzed polyacrylonitrile and the salts of the copolymers of maleic acid and vinyl esters are effective in increasing soil aggregates, they possess several shortcomings. For instance the salts of the copolymers are very slow in the speed of aggregate formation. A period of time ranging from 3 to 4 hours is required before complete activity for optimum results is obtained. As a result of this slow solubility, adverse conditions, such as rains, after application of the soil conditioner cause a slaking of the soil crumbs. Thus, as the product became solubilized and reacted with the clay constituents of the soil in a slaked condition, an impervious crust results. This necessitates reworking the soil. Conditions of this type are detrimental if seeding occurs immedately after application.

It has been observed that because of larger aggregate formation, soil surfaces dry out more rapidly. Although this condition may have good mulching properties, it is detrimental to seed germination in shallow drills.

The shortcomings of the salts of hydrolyzed polyacrylonitrile are several. The aggregating power is ⅓ to ½ that of the aforementioned copolymer. The aggregates slake readily and are not stable to immersion on rain impact. The sodium ions of the sodium polyacrylate type are deleterious to soil structure and have a deflocculating effect.

It is known that rosin itself and the calcium, magnesium, aluminum, iron, etc. salts thereof have been suggested as soil adjuvants in an amount not in excess of 0.3% by weight of the soil. It is claimed that incorporation of rosin in high organic greenhouse soils acts as a fungicide or bactericide and prevents the degradation and removal of humus from the soil micro-organism. While beneficial results are obtained in rich compost mixed greenhouse soils by mixing about 0.3% by weight of rosin or resinate, no beneficial agricultural results are obtained when the same amount of rosin or resinate is mixed with soils containing a substantial or average amount of clay particles. When rosin or a resinate is added to ordinary soil in a concentration ranging from 0.2 to 2.0% by weight of the dry soil, it acts as stabilizing agent. In other words, it mechanically blocks the capillaries of the soil particles or forms a water-repellent film over the clay particles. As a consequence, rosin per se and its various metallic salts, resinates, have been advocated for soil stabilization. The latter involves the manipulation, treatment and compaction of a soil in such a manner that it will remain in its compacted state without detrimental change in shape or volume when subjected to the stresses imposed by traffic and the disintegrating forces of weather.

When rosin itself, abietic acid, and the various salts of abietic acid, such as alkali and alkali earth metal salts, preferably sodium, potassium, ammonium, aluminum, iron, magnesium, calcium, etc., are used in small quantities from 0.2 to 2.0% by weight of the soil as stabilizers, they act as waterproofing agents and as a result maintain the moisture content of a soil at or below optimum moisture level by preventing entry of water into the treated mixture. In other words, they function by making a soil less pervious to water and moisture. Even when incorporated into moist soils, these materials become fixed by the soil particles. Drying of the treated soil accentuates the fixing by inducing the complex molecules, particularly the salts of abietic acid, to orient their inorganic hydrophilic forces towards the inorganic soil particles and their hydrophobic resinous ends toward the atmosphere. By being fixed in this position, the salts shield the water attraction centers on the soil particles and do not permit easy wetting of the system. The salts, including abietic acid, decrease the water affinity as well as the accessibility of the internal surface of cohesion. In this connection, it should be noted that rosin, abietic acid and the various salts of abietic acid are usable not only as stabilizers for soils of sufficient clay content to possess inherent cohesion under dry and moist conditions. The rosin acids, abietic acid and the salts thereof do not add cohesion to a soil system, rather they tend to maintain the natural cohesion of the soil by preventing the entrance of excessive amounts of water.

It has been clearly established that when incorporated into soils, rosin, abietic acid and the various salts thereof reduce the total amount and the rate of water absorption, and through this action, protect cohesive soil systems against the detrimental effect of moisture fluctuation.

In view of the foregoing established facts, it becomes clearly manifest that the addition to soils of rosin, abietic acid and the various salts thereof, in concentrations ranging from 0.2 to 2.0%, would not influence soil aggregation in the same way as the synthetic polyelectrolyte soil conditioners and the components of natural soil humus. It is also manifest that these materials would not reduce the stickiness of clay soils so as to cause them to become crumbly and friable even at high moisture levels.

We have found that, contrary to predictions and established beliefs, a mixture of 5 to 75%, preferably 10 to 50% by weight of abietic acid (1-pimaric acid), or a dimer of abietic acid characterized by the following formula:

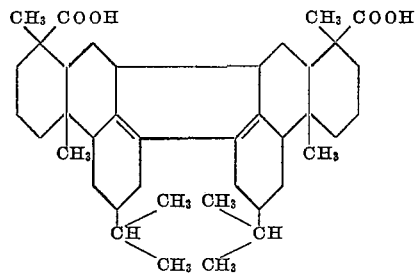

or the maleic anhydride-abietic acid adduct having the following formula:

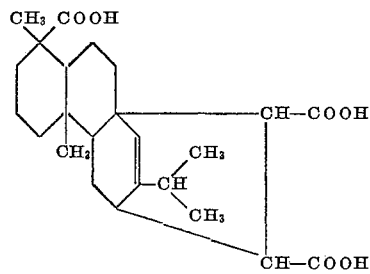

obtained by reacting rosin or abietic acid with maleic anhydride followed by hydrolysis, alkali and alkaline salts thereof and 25 to 95% by weight of a synthetic polyelectrolyte soil conditioner yields a far superior soil conditioner than the synthetic soil conditioners presently available. By incorporating .001 to 2%, preferably .05 to 0.2% of the mixture, based on the dry weight of the soil, stable soil aggregates are readily formed and remain stable under constant perfusion with water and air. Since the aggregates do not break down after a prolonged period of time, it is presumed that the mixture is not susceptible to biological breakdown and loss by leaching. The mixture has the advantage in that it is cheaper in price than the currently available soil conditioners, thus making it available to farmers of large areas of the midwest and elsewhere at a reasonable price.

The mixture may be applied in the spring by working it into the soil when the moisture content is higher or soon after rains, resulting in better workability for wet soils. This particular property is due to the immediate activity of the mixture in forming stable aggregates with the clay particles within a matter of seconds. Wetted soils containing the mixture appear drier because of the immediate activity. The mixture is more effective for producing a larger quantity of water-stable aggregates than the synthetic polyelectrolyte alone. This is attributable to a synergistic effect wherein the rosin, abietic acid, dimer, adduct, or the salts thereof cooperate with the synthetic polyelectrolytes to yield a total effect greater than the sum of the two components in the admixture taken independently, as will be shown hereinafter. This is wholly surprising and unexpected in view of the property of the rosin, abietic acid and the salts thereof to waterproof soils and retard water absorption. Because of the water-repellent characteristics of these materials, their use has been advocated for stabilizing soils wherein the effect is directly opposite to that obtained by soil conditioning agents.

Accordingly, it is an object of the present invention to provide an improved soil conditioning agent comprising a mixture of either rosin, abietic acid, the dimer of rosin acid, or rosin acid adduct, or a rosin salt and a polymeric polyelectrolyte obtained by copolymerizing maleic anhydride with a vinyl ester, vinyl halide, or a vinyl ether.

Other objects and advantages will become apparent from the following description.

The above objects are accomplished by intimately mixing the mixture of powdered rosin, abietic acid, dimer, or adduct, or a rosin salt with a hydrolyzed copolymer or a salt of a copolymer of maleic anhydride and vinyl halide, or vinyl ester or a vinyl ether in the aforestated proportions. The mixture as such, or with other additives, such as inorganic fertilizers, is spread on the surface soil and incorporated therein by the usual raking, disking, or other means. The incorporated mixture instantly forms waterstable aggregates with attendant improvement of soil structure to permit water and plant nutrient absorption.

The rosin employed in preparing the mixture is of any type, obtained from the processing of either the oleoresin extrusion of certain species of pine trees or the stumps and top wood of these same trees, or from the sap of living trees. Regardless of its source, it will be called herein as rosin. All types of rosin, regardless of grade and melting point, exhibit similar characteristics when employed in accordance with the present invention.

The melting point of rosin is not well defined but it softens at a temperature of 70 to 80° C., becomes semifluid in boiling water, and melts completely at a somewhat higher temperature. It is a transparent or translucent material with a specific gravity of approximately 1.07. The color, which is used as a means of grading, varies from a very pale amber to a dark reddish brown. The letters of the alphabet are used to denote the different grades, which vary from grade B, the darkest and most impure type, to W. W., which is water-white, the double letters being used for special grades.

The various rosins with which we experimented contain as the principal constituent more than 90% of abietic acid and a small amount of non-acid materials called resenes. Instead of rosin, abietic acid, the dimer of abietic acid or the maleic anhydride-abietic acid adduct may be used in preparing the mixture with the copolymeric polyelectrolytes defined above. The acid is prepared by the isomerization of rosin and has a melting point ranging from 168° to 180° C. It is soluble in alcohol, benzene, chloroform, ether, acetone and dilute caustic soda solution. Abietic acid, the dimer and the adduct form salts with sodium and potassium hydroxide, which upon complete neutralization, are soluble in water in low concentrations but form gels at higher concentrations. Ammonium rosinates in aqueous solution have a greater tendency to gel formation than the sodium and potassium rosinates. By the use of oxidized rosin, the formation of the ammonium rosinate is favored.

As regards the rosinates employed in preparing the mixtures of the present invention, we prefer to employ the ammonium, potassium, calcium, triethanolamine, and cyclohexylamine salts of the dimer of abietic acid, the maleic anhydride-abietic acid adduct or abietic acid either as such or the salts prepared from rosin or oxidized rosin directly. The triethanolamine and cyclohexylamine salts are prepared by simply adding a neutralizing amount of triethanolamine or cyclohexylamine to a solution of the rosin or abietic acid, or the dimer, or the adduct in benzene, alcohol, acetones, or the like and warming the mixture until neutralization or saponification is completed.

Instead of employing the rosin or dimer, or adduct or rosin salts in the admixture, beneficial results are also obtained by mixing with the copolymeric polyelectrolyte complex salts of rosin corresponding to one molecule of either the ammonium, potassium, sodium or triethanolamine or cyclohexylamine salt and two to three molecules of abietic acid or rosin or the dimer or adduct. The complex salts are prepared by reacting the alkali or triethanolamine or cyclohexylamine with abietic acid or rosin, or dimer or adduct in such proportions that one-fourth to one-half of the acid material is neutralized. One advantage of employing the complex salts in admixture with the hygroscopic copolymeric polyelectrolyte is that the latter lose their hygroscopicity. This property leads to better storage stability of the mixture. The mixture is readily stored and packaged without deterioration or loss of effectiveness.

Since the copolymeric polyelectrolytes powdered rosin, abietic acid, the dimer and the adduct and the foregoing salts are exceptionally light in density, it is desirable, although not absolutely necessary, to incorporate into the prepared soil conditioning mixture 25%–75% of some material having a higher specific gravity, such as colloidal clay, bentonite, aluminum silicates, and the like. Such addition also aids better coverage during application to the soil.

The copolymeric polyelectrolytes employed in accordance with the present invention are characterized by the following general formula:

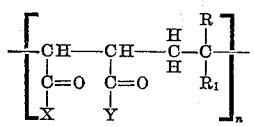

wherein R represents either hydrogen or a lower alkyl, e. g., methyl, ethyl, propyl, and butyl; $R_1$ represents either chlorine, hydroxy, phenyl, alkoxy, e. g., methoxy, ethoxy, propoxy, and butoxy; or carbalkoxy, e. g., carbomethoxy, carbethoxy, carbopropoxy, and carbobutoxy, X represents either —ONa, —OK, —OH, —ONH$_4$, and —OR wherein R is a lower alkyl of the same value as above; Y represents either —OH, —OK, —ONa, —ONH$_4$, —NH$_2$, and —O½Ca, and $n$ represents a number indicative of the extent of copolymerization as determined by specific viscosities which range from 0.4 to 10.0.

The copolymeric polyelectrolytes characterized by the foregoing general formula are obtained by the well known methods of copolymerizing maleic acid or the anhydride thereof as described in United States Patent 2,047,398 and many other patents too numerous to mention. In the case where maleic anhydride is employed in the copolymerization reaction, the copolymer is hydrolyzed with water or alkali or alkaline earth hydroxides including ammonium hydroxide to form the free acid or mono or the di-alkali salts, such as calcium, magnesium, sodium, potassium, or ammonium. The copolymers containing either hydroxyl groups or an anhydride group are esterified with lower alkyl alcohols to form the partial esters. The copolymers wherein X represents —ONH$_4$ and Y represents —NH$_2$ are prepared by treating the copolymer in a special manner—as will be described hereinafter—to yield the ammonium salt half-amide.

The following are illustrative of such copolymeric polyelectrolytes. It is desirable that the copolymeric polyelectrolytes have a molecular weight of at least 10,000 and in the range between 10,000 to 150,000 as determined by specific viscosity measurements, which range from 0.4 to 10.0 (1 gram of copolymer dissolved to a total volume of 100 ml. of 2-butanone at 25° C.):

1. *Vinyl acetate-maleic acid-½ calcium salt.*—Five grams of a copolymer of maleic anhydride and vinyl acetate having a specific viscosity of 4.0 and 1.0 gram of calcium hydroxide were added to 250 ml. of water and agitated until solution was complete.

2. *Vinyl chloride-diammonium maleate.*—Five grams of a copolymer of vinyl chloride and maleic anhydride having a specific viscosity of 4.4 were dissolved in 250 ml. of an aqueous solution containing 5 ml. of concentrated ammonium hydroxide.

3. *Vinyl acetate-diammonium maleate.*—Ten grams of a copolymer of vinyl acetate and maleic anhydride having a specific viscosity of 3.2 were dissolved in 500 ml. of an aqueous solution containing 15 ml. of concentrated ammonium hydroxide.

4. *Vinyl methyl ether-diammonium maleate.*—Five grams of a copolymer of methyl vinyl ether and maleic anhydride having a specific viscosity of 7.0 were dissolved in 250 ml. of an aqueous solution containing 4.5 ml. of concentrated ammonium hydroxide.

5. *Vinyl ethyl ether-diammonium maleate.*—Fifty grams of a copolymer of vinyl ethyl ether and maleic anhydride having a specific viscosity of 0.4 were dissolved in 1 liter of an aqueous solution containing 55 ml. of concentrated ammonium hydroxide.

6. *Vinyl acetate-monosodium maleate.*—Ten grams of a copolymer of vinyl acetate and maleic anhydride having a specific viscosity of 2.5 were dissolved in 500 ml. of an aqueous solution containing 2.2 grams of sodium hydroxide.

7. *Vinyl acetate-monopotassium maleate.*—Ten grams of a copolymer of vinyl acetate and maleic anhydride having a specific viscosity of 1.8 were dissolved in 500 ml. of an aqueous solution containing 3.1 grams of potassium hydroxide.

8. *Vinyl acetate-maleic acid, partial methyl ester, ammonium salts.*—Twenty-five grams of a vinyl acetate-maleic anhydride copolymer having a specific viscosity of 9.2 was converted to partial methyl ester by stirring overnight with 250 ml. of methanol. The vinyl acetate-maleic acid partial methyl ester was isolated by removal of the excess methanol under diminished pressure. Ten grams of the partial ester of the copolymer were then dissolved in 500 ml. of an aqueous solution containing 10 ml. of concentrated ammonium hydroxide.

9. *Vinyl methyl ether-maleic acid-½ calcium salt.*— Fifty grams of the copolymer of vinyl methyl ether and maleic anhydride having a specific viscosity of 7.0 were dissolved in 1 l. of cold water containing 1.4 grams of calcium hydroxide.

10. *Vinyl alcohol-potassium maleate.*—A vinyl formate-maleic anhydride copolymer having a specific viscosity of 5.6 was hydrolyzed in hot water containing a trace of hydrochloric acid. Five grams of the hydrolyzed copolymer were then treated with 100 ml. of an aqueous solution containing 2.2 grams potassium hydroxide to yield the vinyl alcohol-potassium maleate.

It is to be noted that all of the molecules of the copolymeric polyelectrolyte, prior to salt formation, partial esterification, etc., from the same batch do not have the same $n$ but there is quite a distribution around some average value. It is quite difficult and time consuming to determine either the average $n$ or the shape of the distribution curve. Accordingly, in order to provide some indication as to how batches of the copolymers compare with each other with respect to $n$, the thickening effect that a fixed amount of a copolymer has when dissolved in 2-butanone is determined. For this purpose, conventional procedures are followed and the result reported is specific viscosity which is always measured at a concentration of 1 gram of the copolymer (i. e., prior to any subsequent reaction) per 100 ml. of 2-butanone solution at 25° C. The formula is as follows:

$$\text{Specific viscosity} = \frac{\text{viscosity of the solution at 25° C.}}{\text{viscosity of 2-butanone at 25° C.}} - 1$$

Acids, salts, and other derivatives can be prepared from untreated copolymers by opening the anhydride rings of the copolymer. In order to facilitate making viscosity measurements and comparisons, all specific viscosities refer to the particular parent sample of copolymer used in making that particular derivative. This simplifies making comparisons of average $n$'s or average chain lengths, provided that the qualification is kept in mind that the quantitative relationship between the average $n$'s and specific viscosities has not been worked out for the copolymers utilized in accordance with the present invention.

In preparing the ammonium salt-half-amide of the foregoing copolymers, the copolymer is first suspended in an inert medium, such as benzene. To the benzene-copolymer slurry two moles of dry ammonia gas are added per mole of the maleic anhydride charged in the preparation of the copolymer. The amidation reaction takes place within 2 to 4 hours at a temperature ranging from 45 to 60° C. A slight excess of ammonia is added to insure a conversion of 55 to 95% of the anhydride groups to the ammonium salt-half-amide. Within this range of conversion, the ammonium salts-half-amides of the copolymers impart the above desirable characteristics when incorporated into the soil. They have a total nitrogen content ranging from 8 to 12%.

It is to be noted that the foregoing amidation procedure does not yield the full ammonium salt (i. e., substantially complete conversion of all anhydride groups to ammonium salt) which is observed when one treats the copolymer with aqueous solution of ammonia. Treatment of the copolymer with ammonia, lower aliphatic amines and other basic compounds in the presence of water, yields a product having practically no amide groups.

The treatment of all of the above-listed polymers with aqueous solutions of ammonia yields substantially the corresponding diammonium salt, usually referred to as ammonium salt of an alkyl vinyl ether-maleic acid resin.

The following examples will illustrate the conversion of the copolymers to the ammonium salts-half-amides.

EXAMPLE 1

Methyl vinyl ether-maleic anhydride copolymer (1330 grams) having a specific viscosity of 1.2 was suspended in 6500 ml. of benzene. Anhydrous ammonia (35 grams) was bubbled through the slurry for a period of 4 hours at 50–55° C. After all the ammonia had been added, the slurry was warmed for 30 minutes, filtered, and the filtrate washed with benzene and dried in vacuum to yield 1355 grams of dry powder. Nitrogen analysis indicated that 82% of the anhydride groups in the copolymer had been converted to the ammonium salt of its half amide.

EXAMPLE 2

Example 1 was repeated with the exception that 1330 grams of methyl vinyl ether-maleic anhydride copolymer were replaced by 1560 grams of vinyl acetate-maleic anhydride copolymer having a specific viscosity of 1.5. Nitrogen analysis indicated that about 79% of the initial anhydride groups in the copolymer had been converted to the ammonium salt of its half amide.

EXAMPLE 3

Example 1 was repeated with the exception that 1330 grams of methyl vinyl ether-maleic anhydride copolymer were replaced by 1685 grams of vinyl isobutyl ether-maleic anhydride copolymer having a specific viscosity of 4.8. Nitrogen analysis indicated that about 83% of the initial anhydride groups in the copolymer had been converted to the ammonium salt of its half amide.

EXAMPLE 4

Example 1 was repeated with the exception that 1330 grams of methyl vinyl ether-maleic anhydride copolymer were replaced by 1360 grams of vinyl chloride-maleic anhydride copolymer having a specific viscosity of 1.2. Nitrogen analysis indicated that about 81% of the initial anhydride groups in the copolymer had been converted to the ammonium salt of its half amide.

EXAMPLE 5

Example 1 was repeated with the exception that 1330 grams of methyl vinyl ether-maleic anhydride coploymer were replaced by 1685 grams of vinyl propionate-maleic anhydride copolymer having a specific viscosity of 3.5. Nitrogen analysis indicated that about 88% of the initial anhydride groups in the copolymer had been converted to the ammonium salt of its half amide.

The ammonium salts-half-amides prepared as above have a pH ranging from 6.5 to 7.4 in a 1% aqueous solution. The per cent of ammonium nitrogen varies from 3.8 to 5.48 and the per cent amide nitrogen varies from 4.2 to 6.52.

The copolymeric polyelectrolytes characterized by the foregoing general formula in admixture with either rosin, rosinates, or mixtures thereof are added directly to the soils as such in an amount not exceeding 2.0% by weight of the soil, preferably in an amount ranging from 0.05 to 0.2%.

The following procedures and examples illustrate the various tests to which the mixture of copolymeric polyelectrolytes with rosin, rosinates, etc., and mixtures thereof were subjected to establish their unusual and unexpected effectiveness as soil conditioners.

Procedure

The required amount of soil conditioner (0.1%) is mixed thoroughly with 400 g. of air dried Whippany silty clay loam, illitic type, obtained near Whippany, N. J. The soil had previously been passed through a 2.0 mm. opening sieve.

The required amount of water, 30 to 35 ml. of water per 100 g. of air dried soil, is sprinkled over the surface of the leveled soil contained in a 16" x 9½" enamel pan. The wetted soil is then washed and mixed thoroughly with a 4-pronged fork, ensuring that all the soil is wetted.

After leveling off the soil, the pans are securely covered for at least 4 hours, then uncovered, and air-dried by means of a circulating-air fan for at least 16 hours.

Fifty gram portions, in triplicate, are then used for the wet-sieving operation, as well as one control soil.

The sieves are the U. S. Standard Sieve Series Sieve No. 35 with opening of 0.5 mm., and Sieve No. 60 with an opening of 0.25 mm.

In order to find out how much of the standard untreated soil has aggregates with diameters in excess of a suitable limit, such as 0.50 mm., the standard soil is subjected to wet sieving. It is desirable to select a sieve which will retain at least 10% of the standard soil.

The apparatus used for wet-sieving is designed to raise and lower the sieves in water through a distance of 1.5 inches at the rate of 30 cycles per minute. The test should be run for 30 minutes (900 cycles).

Details regarding the procedure for aggregate stability by the wet-sieving technique and the method involved in making the necessary calculations are found in M. B. Russell's "Methods of Measuring Soil Structure and Aeration," appearing in Soil Science, 68, pages 25–35, 1949.

The ammonium salt-half-amide of methyl vinyl ether-maleic anhydride, prepared according to Example 1 was mixed with pulverized N wood rosin, in the ratio of 50, 75 and 90 parts by weight of the copolymeric salt and 50, 25 and 10 parts by weight of rosin, respectively, to give three separate mixtures. Four additional separate mixtures were prepared also by intimate mixing by replacing the rosin with calcium rosinate. The powdered materials were screened to pass a 100-mesh sieve. The mixtures were then tested by mixing 0.1% by weight of each mixture with 100 parts by weight of air dried Whippany silty clay loam. The same soil treated with the copolymeric salt, rosin and calcium rosinate were employed as controls.

The soil was prepared with 27 ml. of water per 100 grams of air-dry soil by the procedure described and submitted to wet-sieving.

The following table gives the percentage increase in water stable aggregates:

TABLE 1.—SOIL CONDITIONER

| Percent Copolymeric Salt of Example 1 | Percent Powdered N Wood Rosin | Percent Calcium Rosinate pptd. | Percent Increase in Water-stable Aggregate Retained—Greater than 0.5 mm. |
|---|---|---|---|
| 100 | | | 85 |
| 90 | | 10 | 285 |
| 85 | | 15 | 305 |
| 75 | | 25 | 285 |
| 50 | | 50 | 300 |
| | | 100 | 175 |
| 100 | | | 85 |
| 90 | 10 | | 115 |
| 75 | 25 | | 110 |
| 50 | 50 | | 110 |
| | 100 | | 5 |

From the foregoing tabulation it is clearly evident that the mixtures of copolymeric salt with rosin and with calcium rosinate are more effective for producing water-stable aggregates than either one of the components of the mixture separately.

Mixtures were prepared as above with the copolymeric salts of illustrations 1 to 10 with rosin, ammonium rosinate, calcium rosinate, potassium rosinate and triethanolamine salt of rosin and subjected to the wet-sieving test. The results obtained are shown in Table II.

Commercially available abietic acid, the dimer of abietic acid sold under the brand name of "Nuroz, Polypale", the maleic anhydride-abietic acid adduct, including hydrogenated rosin and dehydrogenated rosin and the calcium salts of these acidic materials were also tried successfully in various mixtures with the copolymeric polyelectrolyte, and in the same tests as above.

EXAMPLE 6.—WATER PERCOLATION OR DRAINAGE

The soil was prepared with 21 ml. of water per 100 grams of air-dry soil. The soils were allowed to remain wet for 24 hours, worked, then air dried for 24 hours.

To 12 inch glass tubes having a 45 mm. inside diameter and screened on one end to retain the soil, 225 grams of the air-dry soils was added and compacted by tapping to approximately a 6" height. After the soils were thoroughly wetted, a constant head of 6" of water was maintained for a 6½ hour period, and the amount of water passing through the soil column was recorded.

TABLE III

| Treatment | Total amount of Water drained in 6½ hours, ml. |
|---|---|
| Untreated Whippany Silty Clay Loam | 625 |
| 0.075% powdered rosin | 50 |

From the above, it can be stated that rosin at this concentration has a detrimental effect on soil structure which would be more conducive to soil stabilization than soil aggregation.

EXAMPLE 7

Germination and growth studies were performed with tomato seeds, Italian pear variety.

The soil conditioners were mixed with 1600 grams of soil and 35 ml. of water was added per 100 grams of air-dry soil and allowed to remain wet for 24 hours, then worked. The moist soils were then transferred to 6 inch deep clay pots and covered for 24 hours to prevent drying before planting with 20 tomato seeds each. Pots were then covered to exclude light and prevent drying until germination was evident.

TABLE II.—SOIL CONDITIONER

| | Percent by Weight | | | | | Percent Increase in Water-Stable Aggregates Retained | |
|---|---|---|---|---|---|---|---|
| | N. Wood Rosin W. G. | Ammonium Rosinate | Calcium Rosinate | Potassium Rosinate | Triethanolamine Rosinate | Greater than 0.5 mm. | Greater than 0.25 mm. |
| Copolymeric Salt of Illustration 1: | | | | | | | |
| 100 | | | | | | 85 | 110 |
| 85 | | | | 15 | | 285 | 180 |
| 75 | | | | | 25 | 290 | 175 |
| Copolymeric Salt of Illustration 2: | | | | | | | |
| 100 | | | | | | 90 | 105 |
| 75 | | | 25 | | | 300 | 190 |
| Copolymeric Salt of Illustration 3: | | | | | | | |
| 100 | | | | | | 90 | 110 |
| 75 | | | 25 | | | 305 | 185 |
| Copolymeric Salt of Illustration 4: | | | | | | | |
| 100 | | | | | | 95 | 115 |
| 50 | | 50 | | | | 290 | 190 |
| Copolymeric Salt of Illustration 5: | | | | | | | |
| 100 | | | | | | 95 | 115 |
| 85 | | | 15 | | | 285 | 185 |
| Copolymeric Salt of Illustration 6: | | | | | | | |
| 100 | | | | | | 85 | 110 |
| 50 | | | | | 50 | 300 | 175 |
| Copolymeric Salt of Illustration 7: | | | | | | | |
| 100 | | | | | | 90 | 125 |
| 75 | | | 25 | | | 305 | 190 |
| Copolymeric Salt of Illustration 8: | | | | | | | |
| 100 | | | | | | 95 | 115 |
| 75 | | | | | 25 | 285 | 180 |
| Copolymeric Salt of Illustration 9: | | | | | | | |
| 100 | | | | | | 85 | 115 |
| 85 | | | 15 | | | 300 | 180 |
| Copolymeric Salt of Illustration 10: | | | | | | | |
| 100 | | | | | | 100 | 120 |
| 75 | | 25 | | | | 230 | 170 |

The percentage germination and plant growth are recorded in Table IV after three weeks growth.

TABLE IV

| Treatment | Percent Germination | Plant Growth in Centimeters | | |
|---|---|---|---|---|
| | | Smallest | Tallest | Average |
| Copolymeric salt of Example 1 | 80 | 1.4 | 4.4 | 3.1 |
| 75 parts Copolymeric salt of Example 1 and 25 parts powdered rosin | 80 | 2.7 | 6.8 | 4.9 |
| Powdered rosin | 50 | 1.9 | 3.7 | 2.9 |

The above potted plants were watered by sprinkling. The rosin treated soil slaked down, crusted, and cracked with subsequent puddling when watered. The copolymeric salt of Example 1 did not slake down, but retained a crumbly structure with good water penetration. The copolymeric salt of Example 1 and rosin mixture retained the best crumbly structure, and did not slake down with good water penetration. This latter treatment was also unique in that the soil surface was consistently moist after the other two treated soils had dried out to a depth of ½" to one inch.

EXAMPLE 8

The stability to prolonged immersion was demonstrated by dropping a few air-dried treated soil aggregates, about pea size, into 1 inch of water.

After 5 days immersion, the aggregates containing the copolymeric salt of Example 1 had split into many smaller aggregates, the aggregates containing calcium resinate was showing evidence of gradual slaking. The aggregate containing a 50-50 mixture of the copolymeric salt of Example 1 and calcium resinate were form stable and showed no evidence of breaking down. Untreated soil aggregates slake almost immediately upon submersion.

In addition to the copolymeric polyelectrolytes characterized by the foregoing general formula, including the specific species in the various illustrations, copolymeric polyelectrolytes disclosed in the United States Patents 2,625,471–529 and Belgian Patents 501,725–6; 510,281-2-3-4 and 517,035 may be admixed in the ratio of 25 to 95 per cent by weight of the the copolymeric polyelectrolyte with 5 to 75 per cent by weight of rosin, abietic acid, the dimer, the adduct and the various metal salts and complexes referred to above. The same synergistic effect is obtained when the copolymeric polyelectrolytes are admixed with the rosin and the like in the aforestated proportions.

The most interesting and surprising features which we found during the course of our experimental work with the present invention are the results obtained by the employment of a mixture of calcium and mono-amine or polyamine salts of rosin, hydrogenated rosin, dehydrogenated rosin, abietic acid, the dimer of abietic acid, the maleic anhydride-abietic acid adduct and the maleic anhydride-dimer of abietic acid adduct, hereinafter referred to as rosin acid materials.

It appears that the copolymeric polyelectrolytes, in admixture with the rosin and various rosin acids and salts thereof, may be in some type of soils completely replaced by 25 to 95% by weight of a mono- or a polyamine salt of the rosin acid material.

We have found that 5 to 75% by weight of either rosin, abietic acid, the dimer, or the maleic anhydride adduct of either the rosin, abietic acid or the dimer and the calcium salts thereof in admixture with 25 to 95% by weight of a mono- or polyamine salts of these rosin acid materials yield approximately the same results as those obtained with the mixtures containing copolymeric polyelectrolytes.

We have further found that while the calcium salts of these rosin acid materials alone, form some aggregates with the clay soil particles, the aggregates disintegrate with a short time.

From our observations we have concluded that the presence of the mono- or polyamine salt of the rosin acid material not only stabilizes the calcium salt in admixture but in addition the mixture is very effective for producing water-stable aggregates than either one of the components of the mixture separately.

In our preliminary experiments, the following mono- and polyamines were employed in preparing the salts of the various rosin acid materials:

Monoamines:
  Methylamine
  Ethylamine
  Propylamine
  Isopropylamine
  Amylamine
  Isoamylamine
  n-Butylamine
  Isobutylamine
  6-carboxy-n-amylamine
  Cyclohexylamine
  Furfurylamine
  n-Octylamine
  n-Decylamine
  n-Octadecylamine
  Benzylamine
  Naphthmethylamine
Polyamines:
  Ethylenediamine
  Trimethylenediamine
  Tetramethylenediamine
  Triglycoldiamine
  Propylenediamine
  2,3-diaminobutane
  1,4-cyclohexylenediamine
  p-Xylylenediamine
  Hexadecamethylenediamine Equally effective mixtures for producing water-stable aggregates are prepared by first forming partial amine salts of the dimer of abietic acid or the maleic anhydride-abietic acid adduct and then mixing it with the calcium salt of the rosin acid material. In other words, instead of completely neutralizing or saponifying the two carboxylic acid groups of the dimer and the three carboxylic acid groups of the adduct, a sufficient amount of any one of the foregoing monoamines is employed in such quantity so as to saponify only one of the carboxylic acid groups of the dimer or one but not more than two carboxylic acid groups of the adduct. The proportions by weight of the partial amine salt and the calcium salt are the same as stated above.

We claim:

1. A composition for conditioning surface soils consisting of a dry mixture of a carrier selected from the class consisting of colloidal clay, bentonite, and aluminum silicate, 5 to 75 per cent by weight of at least one rosinous material of the group consisting of rosin, abietic acid, abietic acid dimer, maleic anhydride-abietic acid adduct, ammonium, triethanolamine, cyclohexylamine, alkali and alkali earth metal salts thereof, and 25 to 95 per cent by weight of a copolymeric polyelectrolyte characterized by the following general formula:

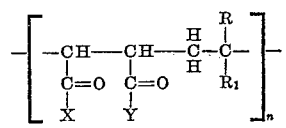

wherein R represents a group selected from the class consisting of hydrogen and lower alkyl, $R_1$ represents a group selected from the class consisting of chlorine, hydroxyl, phenyl, lower alkoxy, and lower carbalkoxy, X represents a member selected from the class consisting of —ONa, —OK, —OH, $ONH_4$, and —OR wherein R represents a lower alkyl group; Y represents a member selected from the class consisting of —OH, —OK, —ONH$_4$, —NH$_2$, and —OCa$_{\frac{1}{2}}$, and $n$ represents a number indicative of the extent of copolymerization as determined by specific viscosities which range from 0.4 to 10.0.

2. A composition according to claim 1 wherein the copolymeric polyelectrolyte is the copolymer of vinyl acetate-maleic acid-½ calcium salt.

3. A composition according to claim 1 wherein the copolymeric polyelectrolyte is methyl vinyl ether-diammonium maleate.

4. A composition according to claim 1 wherein the copolymeric polyelectrolyte is methyl vinyl ether maleic acid-½ calcium salt.

5. A composition according to claim 1 wherein the copolymeric polyelectrolyte is the ammonium salt half amide of the copolymer of methyl vinyl ether-maleic anhydride.

6. A composition according to claim 1 wherein the copolymeric polyelectrolyte is vinyl acetate-monopotassium maleate.

7. The method of conditioning surface soils which comprises incorporating therein an amount not exceeding two per cent by weight of the soil of a dry mixture comprising 5 to 75 per cent by weight of at least one rosinous material of the group consisting of rosin, abietic acid, abietic acid dimer, maleic anhydride-abietic acid adduct, ammonium, triethanolamine, cyclohexylamine, alkali and alkali earth metal salts thereof, and 25 to 95 per cent by weight of a copolymeric polyelectrolyte characterized by the following general formula:

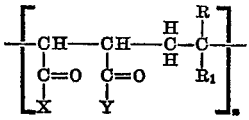

wherein R represents a group selected from the class consisting of hydrogen and lower alkyl, R$_1$ represents a group selected from the class consisting of chlorine, hydroxy, phenyl, lower alkoxy, and lower carbalkoxy, X represents a member selected from the class consisting of —ONa, —OK, —OH, —ONH$_4$, and —OR wherein R represents a lower alkyl group, Y represents a member selected from the class consisting of —OH, —OK, —ONH$_4$, —NH$_2$, and —OCa$_{\frac{1}{2}}$, and $n$ represents a number indicative of the extent of copolymerization as determined by specific viscosities which range from 0.4 to 10.0.

8. The method according to claim 7 wherein the copolymeric polyelectrolyte is the copolymer of vinyl acetate-maleic acid-½ calcium salt.

9. The method according to claim 7 wherein the copolymeric polyelectrolyte is the copolymer of methyl vinyl ether-diammonium maleate.

10. The method according to claim 7 wherein the copolymeric polyelectrolyte is the copolymer of methyl vinyl ether-maleic acid-½ calcium salt.

11. The method according to claim 7 wherein the copolymeric polyelectrolyte is the ammonium salt half amide of the copolymer of methyl vinyl ether-maleic anhydride.

12. The method according to claim 7 wherein the copolymeric polyelectrolyte is the copolymer of vinyl acetate-monopotassium maleate.

References Cited in the file of this patent

UNITED STATES PATENTS

| | | |
|---|---|---|
| 2,625,529 | Hedrick et al. | Jan. 13, 1953 |
| 2,647,094 | Hahn | July 28, 1953 |

FOREIGN PATENTS

| | | |
|---|---|---|
| 501,725 | Belgium | Mar. 7, 1951 |